(12) United States Patent
Matsushita et al.

(10) Patent No.: US 11,421,772 B2
(45) Date of Patent: Aug. 23, 2022

(54) POWER TRANSMISSION DEVICE AND METHOD FOR MANUFACTURING POWER TRANSMISSION DEVICE

(71) Applicants: JATCO Ltd, Fuji (JP); NISSAN MOTOR CO., LTD., Yokohama (JP)

(72) Inventors: Hiroyuki Matsushita, Tajimi (JP); Akira Kamiyama, Zama (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/270,301

(22) PCT Filed: Oct. 29, 2019

(86) PCT No.: PCT/JP2019/042238
§ 371 (c)(1),
(2) Date: Feb. 22, 2021

(87) PCT Pub. No.: WO2020/110554
PCT Pub. Date: Jun. 4, 2020

(65) Prior Publication Data
US 2021/0341046 A1    Nov. 4, 2021

(30) Foreign Application Priority Data
Nov. 27, 2018  (JP) .............................. JP2018-220853

(51) Int. Cl.
*F16H 57/023* (2012.01)
*F16H 57/08* (2006.01)
*F16H 57/10* (2006.01)

(52) U.S. Cl.
CPC ......... *F16H 57/023* (2013.01); *F16H 57/082* (2013.01); *F16H 57/10* (2013.01)

(58) Field of Classification Search
CPC ...... F16H 57/10; F16H 57/023; F16H 57/082; F16H 3/60
See application file for complete search history.

(56) References Cited

U.S. PATENT DOCUMENTS

| 2009/0020386 A1 | 1/2009 | Kato |
| 2015/0369340 A1* | 12/2015 | Sugimoto ............. F16H 37/021 475/159 |
| 2018/0306304 A1* | 10/2018 | Jung ...................... F16H 57/082 |

FOREIGN PATENT DOCUMENTS

| JP | 2006-342846 A | 12/2006 |
| JP | 2016-065578 A | 4/2016 |

* cited by examiner

*Primary Examiner* — Ernesto A Suarez
*Assistant Examiner* — Lori Wu
(74) *Attorney, Agent, or Firm* — Foley & Lardner LLP (57) ABSTRACT

A power transmission device includes: a cylindrical member including an opening formed at a first end in an axial direction, and a wall portion formed at a second end in the axial direction; and a planetary gear set received within the cylindrical member; a carrier of the planetary gear set which includes a protruding portion protruding toward an outer circumference side, and the protruding portion being positioned between the wall portion and a ring gear of the planetary gear set, wherein the carrier is integrally formed with a hub portion of a clutch; the hub portion is positioned on a wall portion side of the carrier; and an outermost circumference portion of the protruding portion is positioned radially outside of an outermost circumference portion of the hub portion.

3 Claims, 5 Drawing Sheets

POWER TRANSMISSION DEVICE AND METHOD FOR MANUFACTURING POWER TRANSMISSION DEVICE

TECHNICAL FIELD

This invention relates to a power transmission device and a method for manufacturing the power transmission device.

BACKGROUND ART

A patent document 1 discloses an automatic transmission including a planetary gear set on a transmission path of a rotation drive force.

It is an objection of the present invention to prevent the falling of the carrier in the planetary gear set.

PRIOR ART DOCUMENT

Patent Document

Japanese Patent Application Publication No. 2016-065578

SUMMARY OF THE INVENTION

A power transmission device comprises:
a cylindrical member including an opening formed at a first end in an axial direction, and a wall portion formed at a second end in the axial direction; and
a planetary gear set received within the cylindrical member;
a carrier of the planetary gear set which includes a protruding portion protruding toward an outer circumference side, and
the protruding portion being positioned between the wall portion and a ring gear of the planetary gear set.

In the present invention, it is possible to prevent the falling of the carrier in the planetary gear set.

DESCRIPTION OF EMBODIMENTS

Hereinafter, FIG. 2 is a view for explaining a portion around a forward and backward switching mechanism 2 of a belt type continuously variable transmission 1.

Figure 2A:
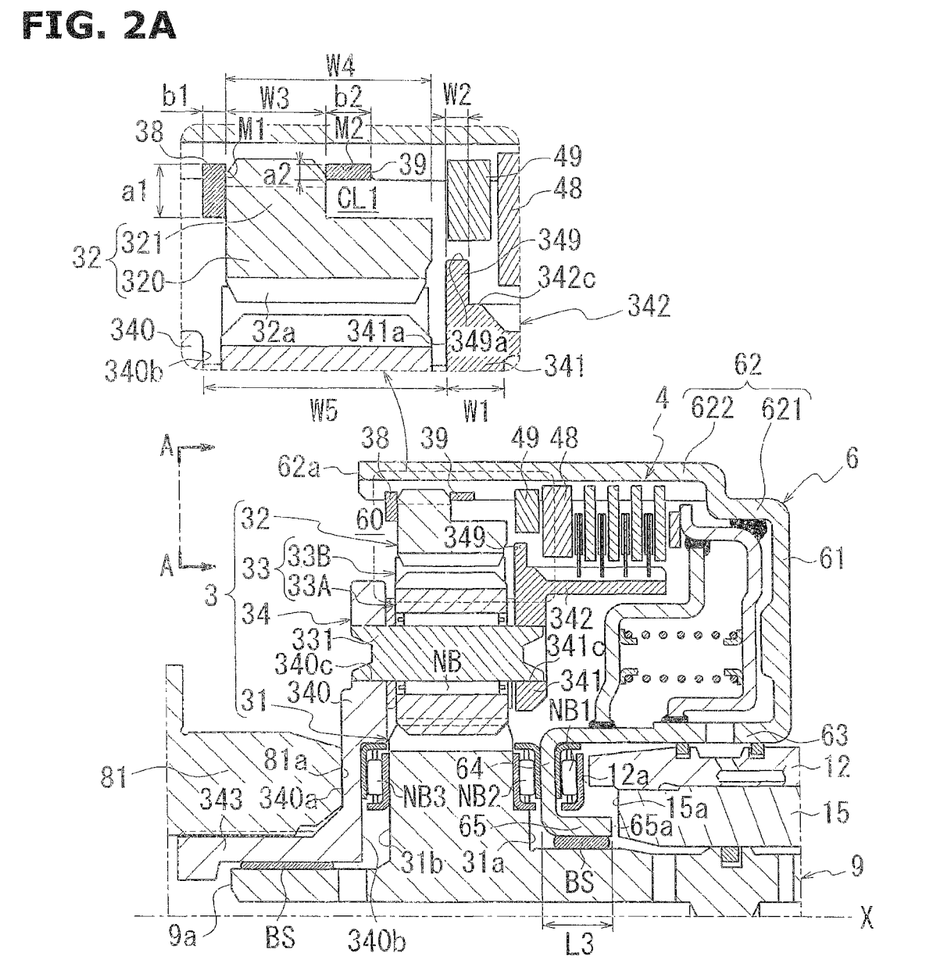
FIGS. 2A and 2B are views for explaining a main part of the forward and backward switching mechanism.
Figure 2B:
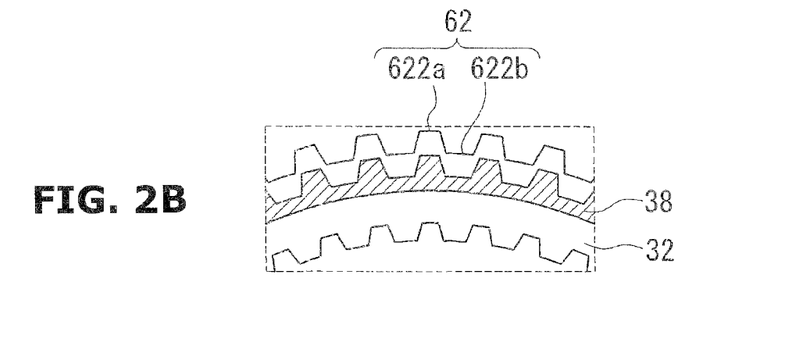

FIGS. 2A and 2B are views for explaining a main portion of the forward and backward switching mechanism 2. FIG. 2A is a view for explaining a configuration of a planetary gear set 3. FIG. 2B is a view when viewed from an A-A direction in FIG. 2A. Besides, a portion around a backward brake 5 is omitted in FIG. 2A.

Figure 1:
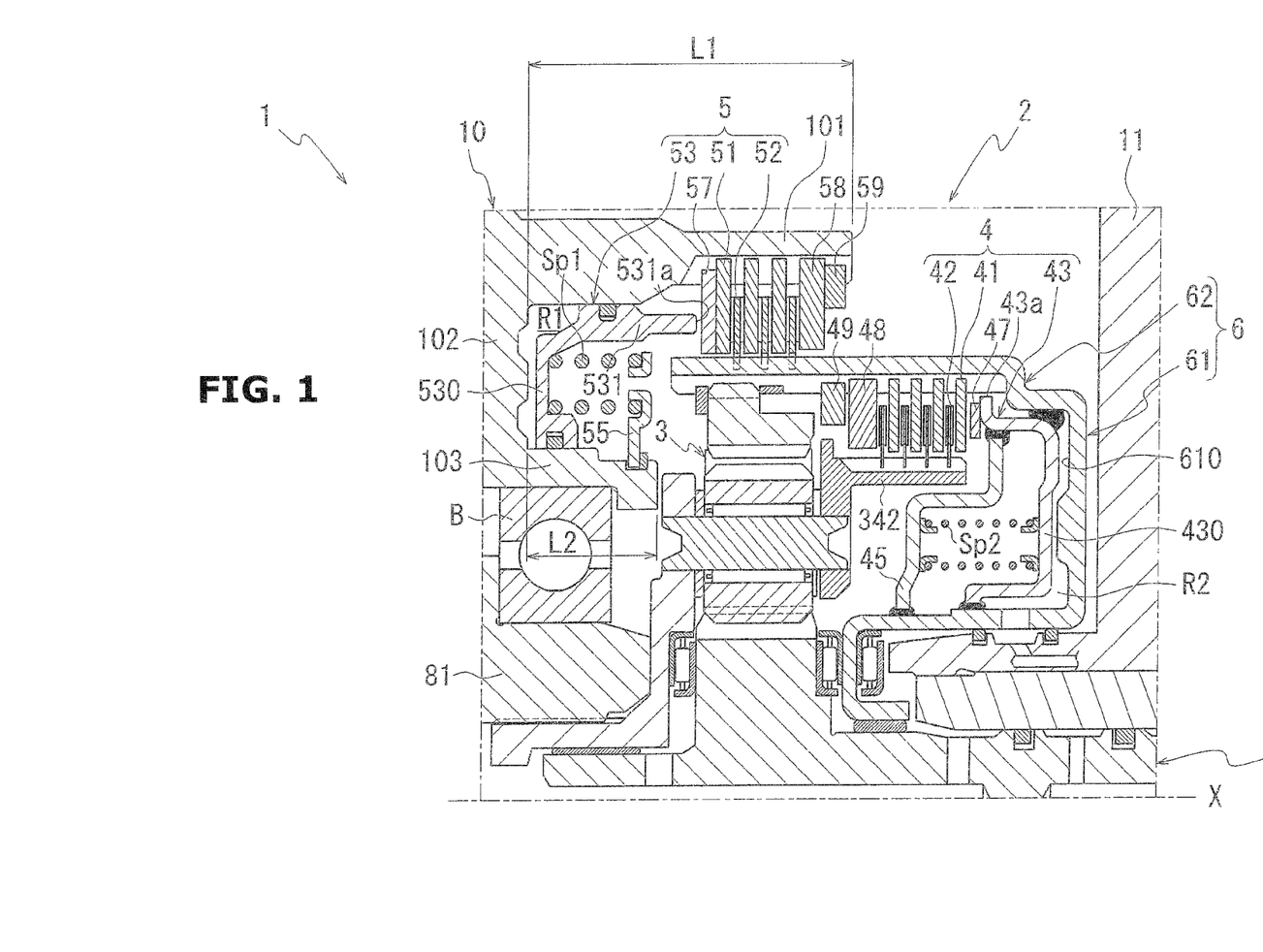
FIG. 1 is a view for explaining a portion around a forward and backward switching mechanism.

As shown in FIG. 1, in the belt type continuously variable transmission 1, a rotational driving force of an engine (not shown) around a rotation axis X is inputted through an output shaft (rotation transmission shaft 9) of a torque converter (not shown) to the forward and backward switching mechanism 2.

The forward and backward switching mechanism 2 includes the planetary gear set 3; a forward clutch 4; and a backward brake 4.

In the forward and backward switching mechanism 2, when the forward clutch 4 is engaged, the rotation inputted from a torque converter side (a right side in the drawing) is outputted in the forward rotation to a shift mechanism portion (not shown) side (a left side in the drawing). When the backward brake 5 is engaged, the rotation inputted from the torque converter side is outputted in the reverse rotation to the shift mechanism portion side.

[Transmission Case 10]

As shown in FIG. 1, a transmission case 10 includes a partition wall portion 102 partitioning between a space receiving the forward\backward switching mechanism 2, and a space receiving the shift mechanism portion. The partition wall space 102 is perpendicular to the rotation axis X. The partition wall portion 102 has a ring shape when viewed from the rotation axis X direction.

The partition wall portion 102 includes an outer circumference side support wall portion 101 surrounding an entire outer circumference of the partition wall portion 102; and an inner circumference side support wall portion 103 surrounding an entire inner circumference of the partition wall portion 102.

The inner circumference side support wall portion 103 has a cylindrical shape extending in a direction (the rotation axis X direction) perpendicular to the partition wall portion 102. A shaft portion 81 of a primary pulley constituting the shift mechanism portion is rotatably supported through a bearing B by the inner circumference side support wall portion 103.

The outer circumference side support wall portion 101 has a cylindrical shape extending in a direction (the rotation axis X direction) perpendicular to the partition wall portion 102. The outer circumference side support wall portion 101 has an extension length L1 from the partition wall portion 102 in the rotation axis X direction. The extension length L1 of the outer circumference side support wall portion 102 is longer than an extension length L2 of the inner circumference side support wall portion 103 (L1>L2).

[Backward Brake 5]

As shown in FIG. 1, the backward brake 5 includes driven plates 51 spline-mounted in an inner circumference of the outer circumference side support wall portion 101 of the transmission case 10; drive plates 52 spline-mounted in an outer circumference of a circumference wall portion 62 of a clutch drum 6; and a piston 53 struck (moved) in the rotation axis X direction.

The driven plates 51 are configured to be moved in the rotation axis X direction in the outer circumference side support wall portion 101 which is a fixed side member, in a state where the rotation around the rotation axis X is restricted.

The drive plates 52 are configured to be moved in the rotation axis X direction in the circumference wall portion 62 in a state where the rotation relative to the clutch drum 6 in a circumferential direction around the rotation axis X is restricted.

The driven plates 51 and the drive plates 52 are alternatingly disposed in the rotation axis X direction. The driven plates 51 and the drive plates 52 are disposed so that inner circumference sides of the driven plates 51 and outer circumference sides of the drive plates 52 are overlapped with each other.

A pressing portion 531 of the piston 53 is positioned in a side region of the overlapping region of the driven plates 51 and the drive plates 52.

The piston 53 includes a ring-shaped base portion 530; and the pressing portion 531 extending from an outer circumference side of the base portion 530.

The base portion 530 is provided in a recessed space between the outer circumference side support wall portion 101 and the inner circumference side support wall portion 103 in the transmission case 10.

The pressing portion 531 is provided on the outer circumference side of the base portion 530. The pressing portion 531 extends in a direction perpendicular to the base portion 530 (in the rotation axis X direction). A tip end surface 531a of the pressing portion 531 confronts the overlapping region between the driven plates 51 and the drive plates 52 in the rotation axis X direction to sandwich a wave spring 57.

A retaining plate 58 is provided on a side opposite to the piston 53 (on the right side in the drawing) when viewed from the driven plates 51 and the drive plates 52. The retaining plate 58 is positioned by a snap ring 59.

A hydraulic chamber R1 is formed in a confronting portion of the partition wall portion 102 confronting the ring-shaped base portion 530 of the piston 53. A hydraulic pressure for the piston 53 is supplied to the hydraulic chamber R1.

When the hydraulic pressure is supplied to the hydraulic chamber R1, the piston 53 is displaced in a direction apart from the partition wall portion 102 (in the rightward direction in the drawing) to compress a spring Sp1 supported by a spring retainer 55.

With this, the driven plates 51 and the drive plates 52 are pressed by the pressing portion 531 of the piston 53, and displaced toward the retaining plate 58 side.

With this, the driven plates 51 and the drive plates 52 are held between the pressing portion 531 and the retaining plate 58 in accordance with the pressure according to the hydraulic pressure.

Moreover, when the driven plates 51 and the drive plates 52 are engaged so as not to be rotated relative to each other, the backward brake 5 is brought to the engagement state, so that the rotation of the clutch drum 6 is restricted. Furthermore, a rotation of a ring gear 32 (cf. FIG. 2A) spline-mounted in the inner circumference of the circumference wall portion 62 of the clutch drum 6 is indirectly restricted.

[Forward Clutch 4]

As shown in FIG. 1, the forward clutch 4 includes driven plates 41 spline-mounted in an inner circumference of the circumference wall portion 62 of the clutch drum 6; drive plates 42 spline-mounted in an outer circumference of a support cylinder 342 of a carrier 34 described later; and a piston 43 struck (moved) in the rotation axis X direction by the hydraulic pressure. The support cylinder 342 has a function of a clutch hub.

The driven plates 41 are configured to be moved in the rotation axis X direction in the circumference wall portion 62, in a state where the rotation around the rotation axis X is restricted.

The drive plates 42 are configured to be moved in the rotation axis X direction in the support cylinder 342 in a state where the rotation relative to the support cylinder 342 in the circumferential direction around the rotation axis X is restricted.

As shown in FIG. 1, the driven plates 41 and the drive plates 42 are alternatively disposed in the rotation axis X direction. The driven plates 41 and the drive plates 42 are disposed so that inner circumference sides of the driven plates 41 and outer circumference sides of the drive plates 42 are overlapped with each other.

A retaining plate 48 is provided on a side opposite to the piston 43 (on the left side in the drawing) when viewed from the driven plates 41 and the drive plates 42. The retaining plate 48 is positioned by a snap ring 49.

A pressing portion 43a of the piston 43 confronts the overlapping region between the driven plates 41 and the drive plates 42 to sandwich a wave spring 47.

The piston 43 is configured to be moved in the forward and backward directions in the rotation axis X direction within a ring-shaped recessed portion 610 provided in a bottom wall portion 61 of the clutch drum 6.

A hydraulic chamber R2 is formed in a confronting portion of the bottom wall portion 61 confronting the ring-shaped base portion 430 of the piston 43. A hydraulic pressure for the piston 43 is supplied to the hydraulic chamber R2.

When the hydraulic pressure is supplied to the hydraulic chamber R2, the piston 43 is displaced in a direction apart from the bottom wall portion 61 (in the leftward direction in the drawing) to compress a spring Sp2 supported by a spring retainer 45.

With this, the driven plates 41 and the drive plates 42 are pressed by the pressing portion 43a of the piston 43, and displaced toward the retaining plate 48 side.

With this, the driven plates 41 and the drive plates 42 are held between the pressing portion 43a and the retaining plate 48 in accordance with the pressure according to the hydraulic pressure.

Moreover, when the driven plates 51 and the drive plates 52 are engaged so as not to be rotated relative to each other, the forward clutch 4 is brought to the engagement state.

In this case, the support cylinder 342 to which the drive plates 42 are spline-mounted is integrally formed with a side plate portion 341 of the carrier 34 of the planetary gear set 3 (cf. FIG. 2A).

Accordingly, when the forward clutch 4 is brought to the engagement state, the relative rotation between the clutch drum 6 and the carrier 34 of the planetary gear set 3 is restricted.

[Planetary Gear Set 3]

As shown in FIG. 2A, the planetary gear set 3 includes a sun gear 31 integrally formed with the rotation transmission shaft 9; a ring gear 32 configured to rotate as a unit with the clutch drum 6; and a pair of pinion gears 33 (33A and 33B) disposed between the sun gear 31 and the ring gear 32, and held by the carrier 34. The planetary gear set 3 is a planetary gear mechanism of a double pinion type.

Besides, the planetary gear set 3 may be a planetary gear mechanism of a single pinion type.

The sun gear 31 of the planetary gear set 3 is integrally formed with the rotation transmission shaft 9. The pinion gear 33A is engaged with an outer circumference of the sun gear 31.

The pinion gear 33A is engaged with the sun gear 31 and the pinion gear 33B. The pinion gear 33B is engaged with an outer circumference of the pinion gear 33A and an inner circumference of the ring gear 32.

The ring gear 32 is spline-mounted in the circumference wall portion 62 of the clutch drum 6.

Figure 3A:
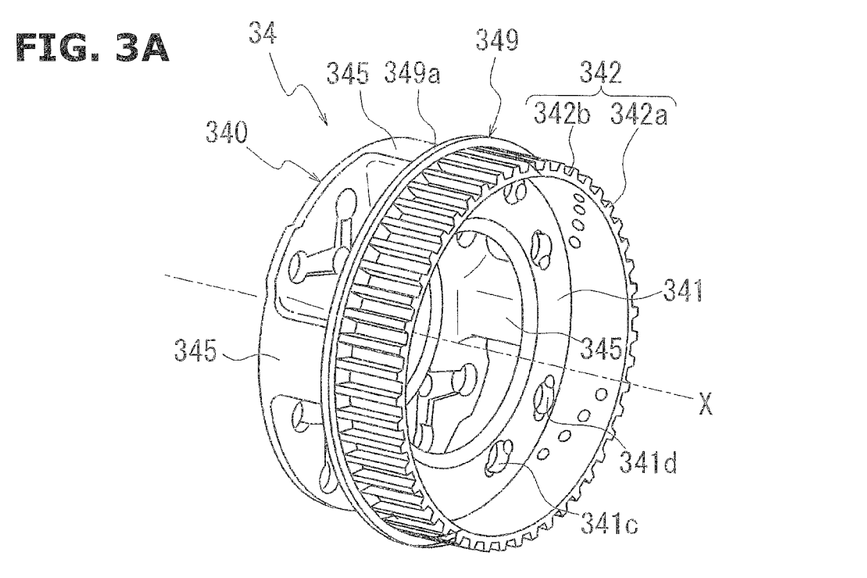
FIGS. 3A and 3B are views for explaining a manufacturing method of a power transmission device.
Figure 3B:
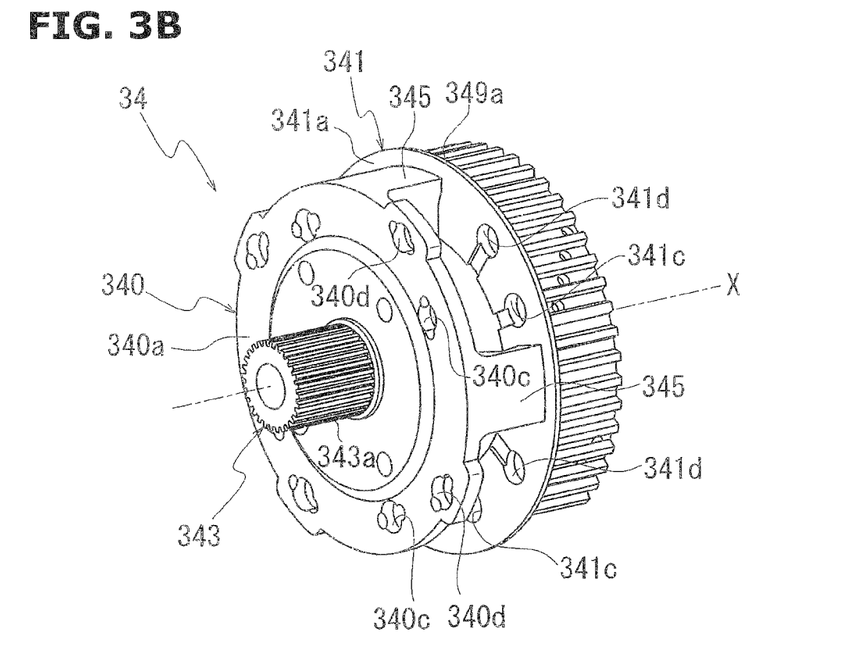

FIG. 3A is a perspective view showing the carrier 34 shown in FIG. 2A when viewed from the support cylinder 342 side (the right side) in the rotation axis X direction. FIG. 3B is a perspective view showing the carrier 34 shown in FIG. 2A when viewed from a connection portion 343 side (the left side) in the rotation axis X direction.

The carrier 34 includes a pair of side plate portions 340 and 341 disposed parallel with each other; a support cylinder 342 integrally formed with the side plate portion 341; and connection bridges (beams) 345 (cf. FIGS. 3A and 3B) connecting the side plate portions 340 and 341 disposed with a clearance in the rotation axis X direction.

As shown in FIG. 3A, the support cylinder 342 is a cylindrical member extending from the outer circumference side of the side plate portion 341. The support cylinder 342 includes spline raised portions 342a and spline recessed portions 342b which are positioned on the outer circumference side, and which are continuously alternatingly formed in the circumferential direction around the rotation axis X.

The drive plates 42 are spline-mounted in the outer circumferences of the spline raised portions 342a of the support cylinder 342 (cf. FIG. 1).

As shown in FIG. 2A, the support cylinder 342 has an opening formed at an end portion opposite to the side plate portion 341. The circumference wall portion 63 on the inside of the clutch drum 6 is inserted from the opening side into the inner circumference side of the support cylinder 342.

As shown in FIG. 3A, the side plate portion 341 has a ring shape having an opening formed at a center. The side plate portion 341 includes a flange portion 349 (protruding portion) which is formed on the outer circumference of the side plate portion 341, and which protrudes toward the radially outward side.

The flange portion 349 is a boundary portion between the side plate portion 341 and the support cylinder 342. The flange portion 349 is positioned on the outer circumference side of the side plate portion 341.

The flange portion 349 is provided on the entire circumference in the circumferential direction around the rotation axis X.

As shown in FIG. 2A, an outermost circumference portion 349a of the flange portion 349 is positioned radially outside an outermost circumference portion 342c of the support cylinder 342 in the radial direction of the rotation axis X.

Moreover, a thickness W2 of the flange portion 349 in the rotation axis X direction is set to be smaller than a thickness W1 of the side plate portion 341 (W1>W2, cf. FIG. 2A). The flange portion 349 is formed to be flush with the side surface 341a of the side plate portion 341 opposite to the support cylinder 342.

As shown in FIGS. 3A and 3B, the side plate portion 341 includes through holes 341c and 341d penetrating through the side plate portion 341 in the thickness direction (in the rotation axis X direction). The four through holes 341c are formed at intervals of substantially 90 degrees in the circumferential direction around the rotation axis X. The four through holes 341d are formed at intervals of substantially 90 degrees in the circumferential direction around the rotation axis X.

The through holes 341c are formed radially inside the through holes 341d in the radial direction of the rotation axis X.

The side plate portion 340 disposed with the clearance with respect to the side plate portion 341 includes through holes 340c and 340d penetrating through the side plate portion 340 in the thickness direction (in the rotation axis X direction). The four through holes 340c are formed at intervals of substantially 90 degrees in the circumferential direction around the rotation axis X. The four through holes 340d are formed at intervals of substantially 90 degrees in the circumferential direction around the rotation axis X.

The through holes 340c are formed radially inside the through holes 340d in the radial direction of the rotation axis X. The through holes 340c and 340d confront the through holes 341c and 341d of the side plate portion 341 in the rotation axis X direction.

As shown in FIGS. 3A and 3B, the side plate portion 340 and the side plate portion 341 are connected by the connection bridges 345 extending in the rotation axis X direction.

The four connection bridges 345 are provided at intervals of substantially 90 degrees in the circumferential direction around the rotation axis X. A position relationship between the side plate portion 340 and the side plate portion 341 in the rotation axis X direction are fixed by the four connection bridges 345.

The through holes 340c and 340d and the through holes 341c and 341d are positioned between the connection bridges 345 and 345 which are adjacent to each other in the circumferential direction.

As shown in FIG. 3B, a cylindrical connection portion 343 is provided on a side surface 340a of the side portion 340 opposite to the connection bridges 345 in the rotation axis X direction.

The connection portion 343 extends in a direction apart from the connection bridges 345 in the rotation axis X direction.

In the continuously variable transmission 1, the outer circumference of the connection portion 343 of the carrier 34 is spline-mounted in the inner circumference of the shaft portion 81 extending from the shift mechanism portion side (cf. FIG. 2A).

The carrier 34 includes the support cylinder 342, the side plate portion 341, the connection bridges 345, the side plate portion 340, and the connection portion 343 which are integrally formed.

As shown in FIG. 2A, the pair of the pinion gears 33 (33A and 33B) are provided in the region between the side surface 340b of the side plate portion 340 and the side surface 341a of the side plate portion 341 of the carrier 34. The pinion gears 33 are supported through needle bearings NB by the pinion shafts 331.

Both ends of the pinion shafts 331 supporting the pinion gears 33A are supported by the side plate portions 340 and 341 of the carrier 34 in a state where the both ends of the pinion shafts 331 are inserted into the through holes 340c and 341c (cf. FIG. 3B).

Both ends of the pinion shafts 331 supporting the pinion gears 33B are supported by the side plate portions 340 and 341 of the carrier 34 in a state where the both ends of the pinion shafts 331 are inserted into the through holes 340d and 341d (cf. FIG. 3B).

The pinion gears 33A and the pinion gears 33B have teeth portions formed in the outer circumference portions. The teeth portions of the pinion gears 33A and the pinion gears 33B are engaged with each other. The pinion gears 33A are engaged with the outer circumference of the sun gear 31. The pinon gears 33B are engaged with the inner circumference of the ring gear 32.

In the planetary gear set 3, when the sun gear 31 and/or the ring gear 32 is rotated around the rotation axis X, the pinion gears 33A supported by the pinion shafts 331, and the pinion gears 33B engaged with the pinion gear 33A are rotated around the rotation axis X while being rotated around own axes.

[Clutch Drum 6]

As shown in FIG. 2A, the planetary gear set 3 and the forward clutch 4 are received within the clutch drum 6.

The clutch drum 6 includes the bottom wall portion 61 having a ring shape when viewed from the rotation axis X direction; the circumference wall portion 62 which is positioned on the outside, and which surrounds the entire outer circumference of the bottom wall portion 61; and the circumference wall portion 63 which is positioned on the inside, and which surrounds the entire inner circumference of the bottom wall portion 61.

The circumference wall portion 62 includes an opening formed on a side opposite to the bottom wall portion 61 in the rotation axis X direction (the left side in the drawing).

The inner circumference wall portion 63 has a cylindrical shape extending along the rotation axis X. This circumference wall portion 63 is mounted on the outer circumference of the cylindrical support wall portion 12 provided on the inner circumference side of the cover portion 11 (cf. FIG. 1).

The clutch drum 6 is supported on the support wall portion 12 which is the fixing member of the transmission case 10, in a state where the rotation around the rotation axis X is allowed.

The inner circumference wall portion 63 includes a connection portion 64 which is formed at a tip end of the circumference wall portion 63, and which extends in the radially inward side (toward the rotation axis X side) to avoid the support wall portion 12; and a cylindrical support cylinder 65 which is formed on the inner circumference side of the connection portion 64.

The support cylinder 65 linearly extends from a lower end of the connection portion 64 in a direction apart from the sun gear 31 (the rightward direction in the drawing). A tip end 65a of the support cylinder 65 is located on the inner circumference side of the support wall portion 12. The tip end 65a of the support cylinder 65 confronts, with a clearance, the tip end 15a of the cylindrical shaft 15 mounted in the inner circumference of the support wall portion 12 by the press-fit.

A needle bearing NB1 is provided between the outer circumference of the support cylinder 65 and the inner circumference of the circumference wall portion 63. The needle bearing NB1 is provided between the connection portion 64 and the tip end 12a of the support wall portion 12 in the rotation axis X direction. The needle bearing NB1 prevents the direct contact between the connection portion 64 and the support wall portion 12.

The support cylinder 65 has a predetermined length L3 in the rotation axis X direction. The inner circumference of the support cylinder 65 is supported through a bush BS (metal ring having a small frictional resistance) on the outer circumference of the rotation transmission shaft 9. The bush BS is press-fit in the inner circumference of the support cylinder 65 of the clutch drum 6. The clutch drum 6 having the support cylinder 65 is supported on the support wall portion 12 to be rotatable around the rotation axis X, in a state where the inclination of the clutch drum 6 with respect to the rotation axis X is restricted.

Moreover, the bush BS supported on the rotation transmission shaft 9 positions the clutch drum 6 in the radial direction.

As described above, the rotation transmission shaft 9 is the output shaft of the torque converter side (not shown). The rotation transmission shaft 9 is rotatably supported on the cylindrical shaft 15 press-fit in the inner circumference of the support wall portion 12.

The tip end 9a side of the rotation transmission shaft 9 penetrates through the inner circumference side of the support cylinder 65 in the rotation axis X direction. The sun gear 31 is integrally formed with the outer circumference of the tip end 9a side of the rotation transmission shaft 9 at a position to avoid the interference with the support cylinder 65.

In the rotation transmission shaft 9, the sun gear 31 protrudes in the radially outward direction of the rotation axis X from the outer circumference at a position apart from the tip end portion 9a to the torque converter side (the right side in the drawing).

A needle bearing NB2 is disposed between the connection portion 64 of the clutch drum 6, and a first end surface 31 of the sun gear 31 in the rotation axis X direction.

The tip end 9a side of the rotation transmission side 9 is inserted within a cylindrical connection portion 343 formed on the inner circumference side of the carrier 34.

A bush BS is provided between the outer circumference of the rotation transmission shaft 9 and the inner circumference of the connection portion 343. The connection portion 343 of the carrier 34 is supported through a bush BS on the rotation transmission shaft 9. The connection portion 343 of the carrier 34 and the rotation transmission shaft 9 are configured to be rotated relative to each other.

A side plate portion 340 of the carrier 34 extends in the radially outward direction from an end portion of the connection portion 343 of on the torque converter side. A tip end 81a of the shaft portion 81 of the primary pulley is abutted on the side plate portion 340 in the rotation axis X direction.

In this state, the inner circumference of the shaft portion 81 and the outer circumference of the connection portion 343 are spline-mounted with each other. The connection portion 343 of the carrier 34 and the shaft portion 81 of the primary pulley are connected so as not to be rotated relative to each other.

In the planetary gear set 3, the sun gear 31 is an input portion to which the rotation is inputted from the torque converter side (the right side in FIG. 2A). The carrier 34 is an output portion from which the rotation is outputted to the shift mechanism section side (the left side in FIG. 2A).

As shown in FIG. 2A, the ring gear 32 of the planetary gear set 3 is splined-mounted in the inner circumference of the circumference wall portion 62 of the clutch drum 6 on the outer circumference side.

The circumference wall portion 62 of the clutch drum 6 on the outer circumference side includes a small diameter portion 621 positioned on the bottom wall portion 61 side; and a large diameter portion 622 having a diameter larger than a diameter of the small diameter portion 621.

As shown in FIG. 2B, the large diameter portion 622 of the circumference wall portion 62 includes splined raised portions 622a and spline recessed portions 622b continuously alternatingly formed in the circumferential direction around the rotation axis X.

These spline raised portions 622a and spline recessed portions 622b are formed in a range between the tip end 62a of the circumference wall portion 62, and a connection portion with the small diameter portion 621 (cf. FIG. 2A).

In the circumference wall portion 62 of the clutch drum 6, the spline raised portions 622a and the spline recessed portions 622b are formed in an entire length of the large diameter portion 622 in the longitudinal direction of the large diameter portion 622 (the rotation axis X).

The large diameter portion 622 of the circumference wall portion 62 extends over the outer circumference sides of the forward clutch 4 and the ring gear 32 of the planetary gear set 3.

The drive plates 52 of the backward brake 5 are spline-mounted on the outer circumference of the tip end 62a side of the circumference wall portion 62 (cf. FIG. 1). The ring gear 32 is disposed radially inside a region in which the driven plates 51 and the drive plates 52 of the backward brake 5 are alternatingly disposed.

As shown in FIG. 2A, the ring gear 32 is a member different from the clutch drum 6. The ring gear 32 includes a ring-shaped base portion 320 having a teeth portion 32a formed on the inner circumference; a mounting portion 321 protruding in the radially outward direction from the outer circumference of the base portion 320.

The ring gear 32 is an internal gear. A portion in which an outer circumference surface of the internal gear of the ring gear 32 (a surface opposite to the teeth surface) is formed is supported by two snap rings (first snap ring 38, and second snap ring 39).

The mounting portion 321 protrudes in the radially outward direction from an outer circumference of one end side (the opening portion 60 side) of the base portion 320. The mounting portion 321 is provided for the ring gear 32 to be spline-mounted in the inner circumference of the large diameter portion 622 of the clutch drum 6.

As shown in FIG. 2A, a width W3 of the mounting portion 321 in the rotation axis X direction is smaller than a width of the base portion 320 in the rotation axis X direction. These widths W3 and W4 are smaller than a width W5 from the side plate portion 340 of the carrier 34 to the side plate portion 341 of the carrier 34 (W5>W4>W3).

When the ring gear 32 is splined-mounted in the inner circumference of the large diameter portion 622, a radial clearance CL12 is formed on the forward clutch 4 side (the right side in the drawing) of the mounting portion 321.

The first snap ring 38 and the second snap ring 39 are mounted and fixed in the inner circumference of the large diameter portion 622 on the both sides of the mounting portion 321 of the ring gear 32 (cf. FIG. 2A).

These first snap ring 38 and second snap ring 39 are configured to position the ring gear 32 in the rotation axis X direction. The first snap ring 38 and the second snap ring 39 are engaged, respectively, with grooves M1 and M2 formed in the circumference wall portion 62. Thicknesses b1 and b2 of the first snap ring 38 and the second snap ring 39 in the rotation axis X direction correspond to thicknesses of the grooves M1 and M2 in the rotation axis X direction.

In this embodiment, the first snap ring 38 is deviated from the region of the outer circumference side of the ring gear 32 in the rotation axis X direction. The first snap ring 38 is not overlapped with the ring gear 32 in the radial direction.

The first snap ring 38 is configured to prevent the ring gear 32 from falling from the opening portion 60 of the bottomed clutch drum 6.

The second snap ring 39 is positioned on the outer circumference side of the ring gear 32. The second snap ring 39 is overlapped with the ring gear 32 in the radial direction.

The second snap ring 39 is configured to prevent the movement of the ring gear 32 toward the bottom wall portion 61 side (the right side in the drawing) of the clutch drum 6.

The ring gear 32 is provided in a state where the ring gear 32 is positioned by the second snap ring 39, so as to avoid the interference with the snap ring 49 of the forward clutch 4. Accordingly, there is a clearance between the ring gear 32 and the snap ring 49 in the rotation axis direction.

In a case where the ring gear 32 and the snap ring 49 are constantly abutted on each other, when the ring gear 32 receives the pressing force of the piston 43, the relative eccentric amount of the ring gear 32 with respect to the sun gear 31 and the pinion gears 33A and 33b is increased. With this, the gear noise may be generated. However, it is possible to prevent the generation of the gear noise by the clearance.

Moreover, the ring gear 32 is provided in the state where the ring gear 32 is positioned by the second snap ring 39, so as to avoid the interference with the flange portion 349 protruding from the side plate portion 341 of the carrier 34 in the radially outward direction. Accordingly, there is a clearance between the ring gear 32 and the side plate portion 341 (the flange portion 349) in the rotation axis direction.

Furthermore, in this embodiment, there is a radial clearance between the flange portion 349 and the snap ring 49 of the clutch drum 6. Moreover, there is a clearance between the flange portion 349 and the retaining plate 48 in the rotation axis direction.

In this case, in this embodiment, when the load (the gravity, or the unexpected force) is not acted to a portion around the planetary gear set 3, the flange portion 349 is designed so as not to be abutted on the ring gear 32, the snap ring 49, and the retaining plate 48.

In particular, the outermost circumference portion 349a of the flange portion 349 is designed to avoid the interference with the other members (for example, the ring gear 32, and the retaining plate 48).

A radial length a2 of the second snap ring 39 is smaller than a radial length a1 of the first snap ring 38 (a2<a1).

The second snap ring 39 is disposed to be overlapped with the ring gear 32 in the radial direction. Accordingly, the second snap ring 39 needs to have the length by which the second snap ring 39 can be received within the clearance CL1 between the outer circumference of the base portion 320 of the ring gear 32, and the inner circumference of the circumference wall portion 62 (the spline recessed portions 622b).

With this, the second snap ring 39 needs not to be deviated from the region of the outer circumference side of the ring gear 32 in the rotation axis X direction. Accordingly, it is possible to prevent the size increase of the circumference wall portion 62 of the clutch drum 6 in the rotation axis X direction.

Furthermore, the thickness b1 of the first snap ring 38 in the rotation axis X direction is different from the thickness of the second snap ring 39 in the rotation axis X direction. With this, the workers can readily distinguish the first snap ring 39 and the second snap ring 39 at the assembly operation.

Moreover, the thickness b1 of the first snap ring 38 in the rotation axis X direction is smaller than the thickness of the second snap ring 39 in the rotation axis X direction. In a case where the thickness b1 of the first snap ring 38 in the rotation axis X direction is increased, a space in which the component of the planetary gear set 3 and so on is not disposed is remained. The size of the circumference wall portion 62 of the clutch drum 62 in the rotation axis X direction is increased due to the above-described residual space.

In the clutch drum 6, the second snap ring 39 is positioned on the bottom wall portion 61 side (the bottom side) of the first snap ring 38. In the cylindrical bottomed clutch drum 6, the first snap ring 38 is positioned on the opening portion 60 side of the second snap ring 39.

The snap ring (the first snap ring 38) having the small thickness in the rotation axis X direction is provided on the opening portion 60 side. With this, it is possible to effectively use the space on the opening portion 60 side on the inside of the circumference wall portion 62 of the clutch drum 6.

The snap ring 49 pf the forward clutch 4 is provided on the bottom wall portion 61 side (the bottom side) when viewed from the second snap ring 39. The snap ring 49 is provided with the clearance with respect to the second snap ring 39 and the ring gear 32.

The second snap ring 39 is provided between the first snap ring 38 and the snap ring 49 in the rotation axis X direction.

The snap ring 39 has a flat section relative to the first snap ring 38. The radial length a2 of the snap ring 39 is small. Accordingly, the ring gear 32 may be inclined toward the forward clutch 4 side. In this case, the snap ring 49 near the second snap ring 39 can prevent the inclination of the ring gear 32.

Moreover, the mounting portion 321 of the ring gear 32 is positioned between the first snap ring 38 and the second snap ring 39. The ring gear 32 is disposed with the slight backlash. Accordingly, when the sun gear 31 and the carrier 34 are inclined with respect to the rotation axis X, the ring gear 32 can be self-centered.

Furthermore, the ring gear 32 of the planetary gear set 3 is a member different from the circumference wall portion 62 of the clutch drum 6. This ring gear 32 is fixed to the circumference wall portion 62 of the clutch drum 6 (the drum member). With this, it is unnecessary to provide a new support member of the ring gear.

Moreover, the drive plates 52 of the backward brake 5 are supported on the circumference wall portion 62 supporting the ring gear 32. Accordingly, the circumference wall portion 62 is shared for the fixing and the support of the two components. Consequently, it is possible to decrease the number of the components relative to a case where a dedicated component is provided for the fixing and the support. Therefore, it is possible to decrease the manufacturing cost of the continuously variable transmission 1.

Hereinafter, an assembly operation around the planetary gear set 3 in a process manufacturing the continuously variable transmission 1 is explained by using FIGS. 4A-4E and FIGS. 5A-5D.

In this case, in a case where the respective components are assembled, the plurality of spline engagement may be needed to be performed at the same time. In a case where the spline engagement is performed at the same time, it is difficult that one spline engagement and the other spline engagement are positioned so that the one spline engagement and the other spline engagement are engaged at the same time. It is necessary that these are set to perform the fine adjustment of the directions of the components.

In this case, the assembly operation is performed while the components are reciprocatively displaced at several times in the clockwise and counterclockwise directions at the position around the spline engagement. It is problematic that the number that the splines are contacted against each other is increased.

Accordingly, the subassembly is formed by engaging the splines one by one. Then, the subassemblies are mounted so that the spline engagement becomes one. With this, it is possible to avoid the plurality of the spline engagements at the same time. Accordingly, it is possible to solve the above-described problems.

In the manufacturing process of the continuously variable transmission 1 according to the embodiment, the continuously variable transmission 1 is assembled within the transmission case 10 in a state where the clutch drum 6 and the planetary gear set 3 of the forward and backward switching mechanism 2 are previously assembled (in the subassembly state).

FIGS. 4A-4E are views explaining a process from the assembly operation of the planetary gear set 3 to the clutch drum 6, to the assembly operation to the rotation transmission shaft 9.

Figure 4A:
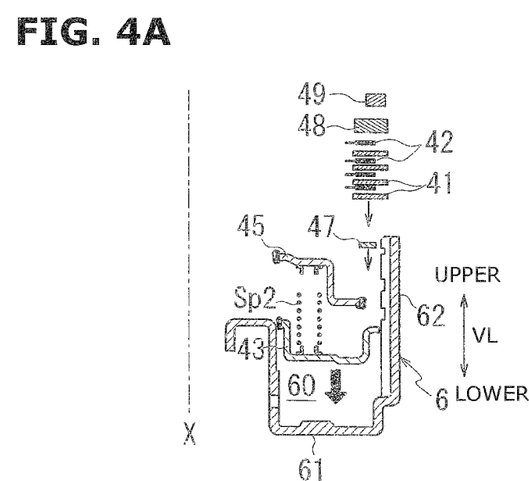
FIGS. 4A-4E are views for explaining a manufacturing method of a power transmission device.

As shown in FIG. 4A, firstly, the clutch drum 6 is fixed to a jig in a where the opening portion 60 is directed in the upward direction of the vertical line VL. In this state, the constituting components of the forward clutch 4 is assembled within the clutch drum 6 from the opening portion 60 side.

In particular, the piston 43, the spring Sp2, and the spring retainer 45 are assembled in this order. Then, the wave spring 47 is inserted within the circumference wall portion 62, and disposed at a position at which the wave spring 47 are abutted on the pressing portion 43a of the piston 43 (cf. FIG. 4B).

Figure 4B:
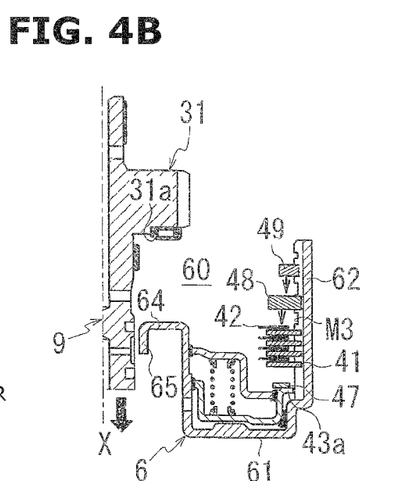

Next, the driven plates 41 are set within the circumference wall portion 62 to be spline-mounted in the inner circumference of the inner circumference wall portion 62. Then, the drive plates 42 and the driven plates 41 are alternatingly set within the circumference wall portion 62. In this case, the driven plates 41 are spline-mounted in the circumference wall portion 62.

When the setting of the final drive plate 42 is finished, the retaining plate 48 is inserted within the circumference wall portion 62. The snap ring 49 is snap-engaged with the groove M3 within the circumference wall portion 62. With this, the assembly operation of the main part of the forward clutch 4 is finished.

Then, the rotation transmission shaft 9 integrally formed with the sun gear 31 is inserted from the upper side of the opening portion 60 side into the support cylinder 65 of the clutch drum 6 (cf. a bold arrow in the drawing).

Figure 4C:
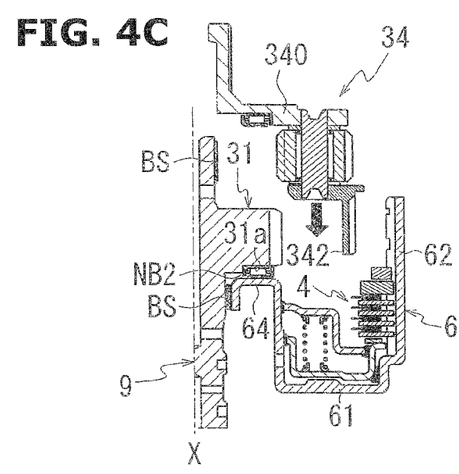

The rotation transmission shaft 9 is assembled to the clutch drum 6 until the needle bearing NB2 is positioned between the one end surface 31a of the sun gear 31, and the connection portion 64 of the clutch drum 6 (cf. FIG. 4C). In this state, the clutch drum 6 is rotatably supported on the rotation transmission shaft 9 by the bush BS disposed between the inner circumference of the support cylinder 65, and the outer circumference of the rotation transmission shaft 9.

Next, the carrier 34 to which the pinion gears 33A and 33B is assembled is inserted from the upper side of the opening portion 60 side into the support cylinder 65 of the clutch drum 6, in a state where the support cylinder 65 of the clutch drum 6 is directed in the downward direction (cf. a bold arrow in FIG. 4C).

Figure 4D:
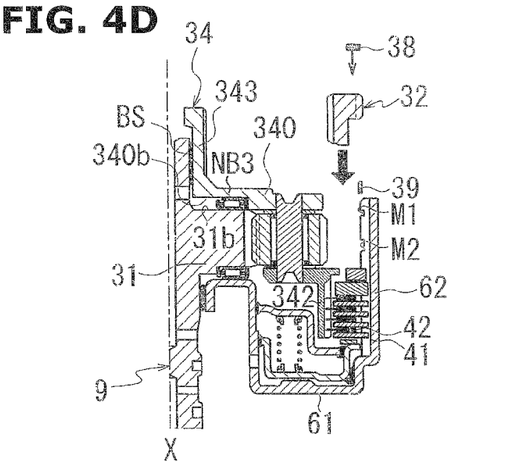

The carrier 34 is assembled to the clutch drum 6 until the needle bearing NB3 is positioned between the side surface 340b of the side plate portion 340, and side surface 31b of the sun gear 31 (cf. FIG. 4D). In this state, the carrier 34 is rotatably supported on the rotation transmission shaft 9 by the bush BS disposed between the inner circumference of the connection portion 343, and the outer circumference of the rotation transmission shaft 9.

Next, as shown in FIG. 4D, the second snap ring 39 is snap-engaged with the groove M2 of the inner circumference of the circumference wall portion 62. Then, the ring gear 32 is inserted from the upper side of the opening portion 60 side into the circumference wall portion 62 to be spline-engaged with the circumference wall portion 62 (cf. FIG. 4D).

Figure 4E:
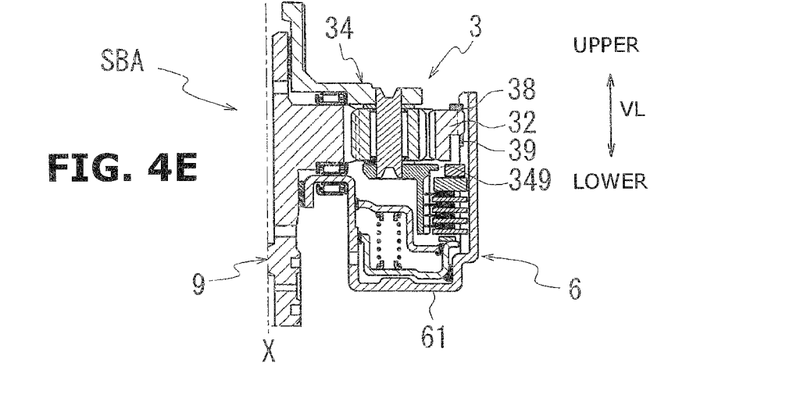

Finally, the first snap ring 38 is snap-engaged with the groove M1 of the inner circumference of the circumference wall portion 62 to position the ring gear 32 (cf. FIG. 4E).

With this, the subassembly of the clutch drum 6 and the planetary gear set 3 of the forward and backward switching mechanism 2 is finished.

In this state of FIG. 4E, the carrier 34 of the planetary gear set 3 is configured to be displaced relative to the clutch drum 6 and the rotation transmission shaft 9 in the assembly direction (the vertical line VL in the drawing).

The flange portion 349 of the carrier 34 is positioned between the bottom wall portion 61 of the clutch drum 6, and the ring gear 32 in the vertical line VL direction. The flange portion 349 is overlapped with the ring gear 32 and the bottom wall portion 61 when viewed from the vertical line VL direction.

The assembly operation of the subassembly SBA of the clutch drum 6 and the planetary gear set 3 of the thus-constructed forward and backward switching mechanism 2 to the transmission case 10 is explained.

FIGS. 5A-5D are views for explaining an assembly process of the subassembly SBA to the transmission case 10.

Figure 5A:
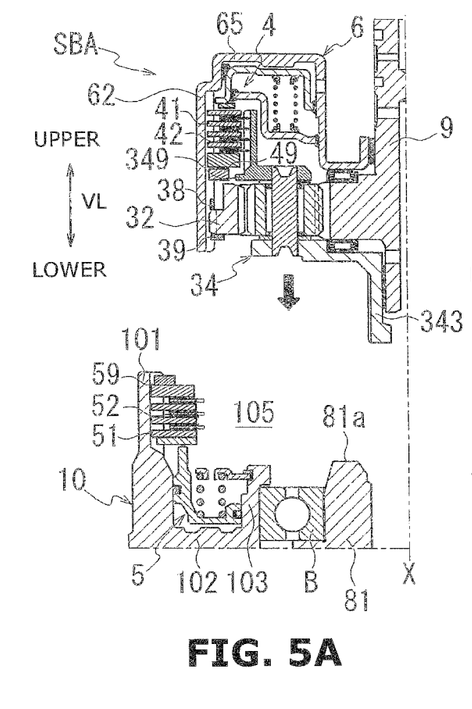
FIGS. 5A-5D are views for explaining a manufacturing method of a power transmission device.

When the subassembly SBA is assembled to the transmission case 10, the transmission case 10 is fixed to a jig (not shown) in a state where the opening portion 105 is directed in the upward direction of the vertical line VL direction as shown in FIG. 5A.

In the transmission case 10 shown in FIG. 5A, the driven plates 51 of the backward brake 5 are spline-mounted in the inner circumference of the outer circumference side support wall portion 101. The assembly of the constituting components of the backward brake 5 are finished.

The shaft portion 81 of the primary pulley constituting the shift mechanism portion is rotatably supported on the inner circumference of the inner circumference side support wall portion 103 through the bearing B. The tip end 81a of the shaft 81 protrudes in the upward direction above the partition wall portion 102.

The subassembly SBA is inserted within the outer circumference side support wall portion 101 of the transmission case 10 from the upper side of the opening portion 105 in a state where the cylindrical connection portion 343 of the carrier 34 is directed in the downward direction on the transmission case 10 side (cf. a bold arrow in the drawing).

In the state of FIG. 5A, the carrier 34 of the planetary gear set 3 is configured to be displaced relative to the clutch drum 6 and the rotation transmission shaft 9 in the assembly direction (the vertical line VL in the drawing).

The flange portion 349 of the carrier 34 is positioned between the bottom wall portion 61 of the clutch drum 6 and the ring gear 32 in the vertical line VL direction.

The movement of the ring gear 32 in the vertical line VL direction is restricted by the snap rings (the first snap ring 38 and the second snap ring 39) engaged with the inner circumference of the circumference wall portion 62 of the clutch drum 6.

Accordingly, even when the carrier 34 is displaced toward the transmission case 10 by the own weight, the movement of the carrier 34 in the vertical line VL direction is restricted when the flange portion 349 of the carrier 34 is abutted on the ring gear 32.

Therefore, in the process in which the subassembly SBA is assembled to the transmission case 10, the carrier 34 is configured so as not to be fallen (dropped out) from the subassembly SBA.

In this case, the movements of the driven plates 41 and the drive plates 42 of the forward clutch 4 in the downward direction on the transmission case 10 side is restricted by the snap ring 49 engaged with the inner circumference of the circumference wall portion 62.

Figure 5B:
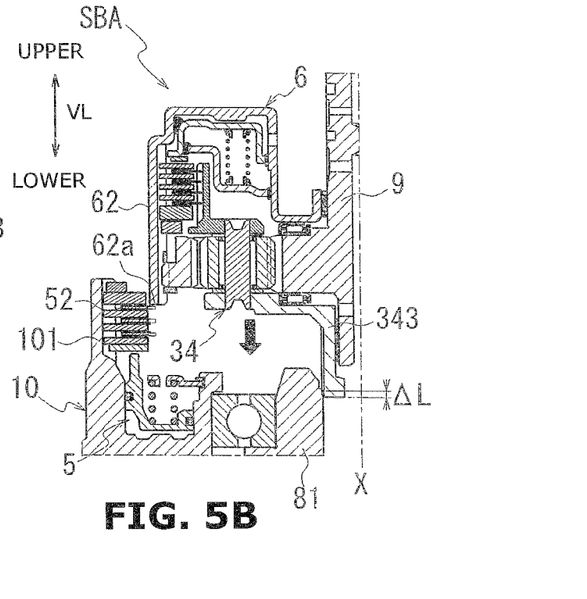

As shown in FIG. 5B, the subassembly SBA is displaced along the vertical line VL direction in the downward direction on the transmission case 10 side, the connection portion 343 of the carrier 34 and the shaft portion 81 are firstly spline-mounted.

When the spline-mounting length between the connection portion 343 and the shaft portion 81 reaches a predetermined length ΔL, the spline-mounting between the tip end 62a side of the circumference wall portion 62 of the clutch drum 6, and the drive plates 52 of the backward brake 5 is started.

Accordingly, the center axis of the rotation transmission shaft 9 of the subassembly SBA side, and the center axis of the shaft portion 81 are aligned with each other until the connection portion 343 and the shaft portion 81 are engaged by the predetermined length ΔL.

Figure 5C:
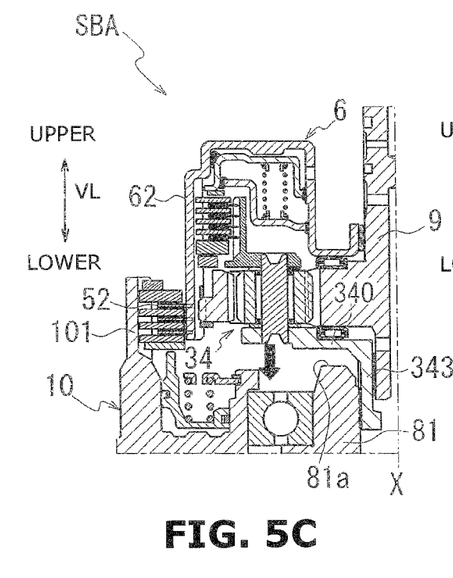

With this, it is possible to smoothly spline-mount the driven plates 52 on the outer circumference of the circumference wall portion 62 of the clutch drum 6 (cf. FIG. 5C).

Figure 5D:
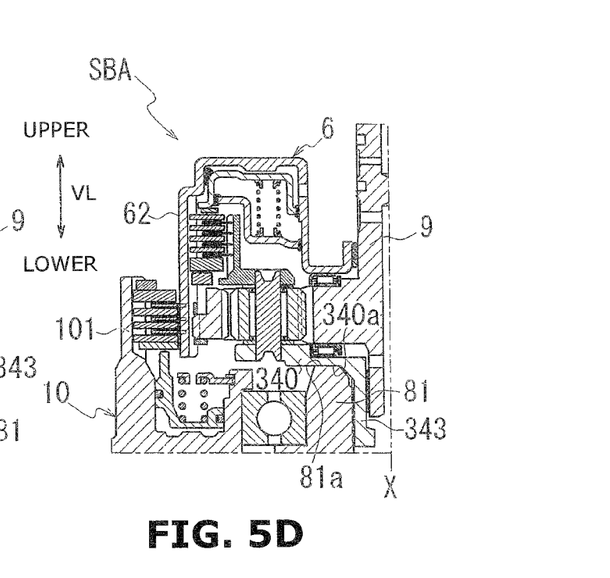

Then, the assembly operation of the subassembly SBA to the transmission case 10 is finished when the tip end 81a of the shaft portion 81 is abutted on side surface 340a of the side plate portion 340 of the carrier 34 (cf. FIG. 5D).

In this way, when the subassembly SBA is assembled to the transmission case 10, the carrier 34 is configured to be moved within the circumference wall portion 62 of the clutch drum 6 relative to the clutch drum 6 and the rotation transmission shaft 9 in the vertical line VL direction.

As described above, the flange portion 349 of the carrier 34 is positioned between the bottom wall portion 61 of the clutch drum 6, and the ring gear 32 in the vertical line VL direction.

The movement of ring gear 32 in the vertical line VL direction is restricted by the snap rings (the first snap ring 38 and the second snap ring 39) engaged with the inner circumference of the circumference wall portion 62 of the clutch drum 6.

Accordingly, even when the carrier 34 is displaced toward the transmission case 10 by the own weight, the movement of the carrier 34 in the vertical line VL direction is restricted when the flange portion 349 of the carrier 34 is abutted on the ring gear 32.

Therefore, in the process in which the subassembly SBA is assembled to the transmission case 10, the carrier 34 is configured so as not to be fallen (dropped out) from the subassembly SBA.

Contrary to this, in a case where the flange portion 349 is provided to the carrier 34, the worker supports the carrier 34 by the hand to prevent the falling (the dropout) of the carrier 34 when the subassembly SBA is assembled to the transmission case 10.

Moreover, when the tip end 81a of the shaft portion 81 is abutted on the side plate portion 340 of the carrier 34, the support by the hand needs to be released. In this case, the carrier 34 may be detached from the clutch drum 6 and the rotation transmission shaft 9.

In this embodiment, the flange portion 349 is provided. Accordingly, in the process in which the subassembly SBA is assembled to the transmission case 10, the support of the carrier 34 by the hand, and the dropout of the carrier 34 are hard to be generated.

With this, it is possible to smoothly perform the assembly operation of the subassembly SBA to the transmission case 10.

The continuously variable transmission 1 described above as one example of the power transmission device according to the embodiment has the following configuration.

The power transmission device includes:

the clutch drum 6 (cylindrical member) including an opening formed at a first end in the rotation axis X direction (axial direction), and the bottom wall portion 61 formed at a second end in the axial direction; and the planetary gear set 3 received within the clutch drum 6;

the carrier 34 of the planetary gear set 3 which includes the flange portion 349 (protruding portion) protruding toward an outer circumference side, and the flange portion 349 being positioned between the bottom wall portion 61 and the ring gear 32 of the planetary gear set 3.

In this case, the falling of the carrier 34 toward the bottom wall portion 61 is prevented from the bottom wall portion 61. In a case where the both ends of the clutch drum 6 in the rotation axis X direction are wall portions, it is not possible to receive the planetary gear set 3. Accordingly, the first end (a side opposite to the bottom wall portion 61) is opened to form the opening portion 60. Therefore, it is problematic that the carrier 34 is fallen (dropped out) from the opening portion 60.

Accordingly, by the above-described configuration, the flange portion 349 is formed to be positioned between the bottom wall portion 61 and the ring gear 32, and to be overlapped with the bottom wall portion 61 and the ring gear 32 when viewed from the rotation axis X direction. With this, when the carrier 34 is about to be fallen, the flange portion 349 is caught on the ring gear 32, so that it is possible to prevent the falling (dropout) of the carrier 34

The continuously variable transmission 1 described above as one example of the power transmission device according to the embodiment has the following configuration.

(2) The ring gear 32 is a member different from the clutch drum 6.

The ring gear 32 can be integrally formed with the clutch drum 6. In this case, when the carrier 34 is received from the opening portion 60 of the clutch drum 6, the flange portion 349 of the carrier 34 is caught on the ring gear 2, so that it is difficult to perform the subassembly.

Accordingly, by the above-described configuration, the ring gear 32 can be received within the clutch drum 6 after the carrier 34 is received within the clutch drum 6. Consequently, it is possible to easily assemble the planetary gear set 3 to the clutch drum 6 (cf. FIGS. 4C and 4D).

The continuously variable transmission 1 described above as one example of the power transmission device according to the embodiment has the following configuration.

(3) The carrier 34 is integrally formed with the support cylinder 342 (the hub portion) of the forward clutch 4; the support cylinder 342 is positioned on the bottom wall portion 61 side of the carrier 34; and the outermost circumference portion 349a of the flange portion 349 is positioned radially outside of the outermost circumference portion 342c of the support cylinder 342.

In a case where there is the support cylinder 342, it is conceivable that the support cylinder 342 is used as a stopper configured to prevent the falling, by expanding the support cylinder 342 toward the outer circumference side.

In this case, the clutch plates (the driven plates 41, and the drive plates 42) of the forward clutch 4 are positioned on the outer circumference side of the support cylinder. Accordingly, the space for the disposition of the clutch plates is decreased in the radial direction, so that the frame (constitution) of the clutch drum 6 is increased.

Accordingly, by the above-described configuration, the flange portion 349 provided to the carrier 34 is used as the stopper. With this, it is possible to prevent the falling of the carrier 34 without decreasing the space for the disposition of the clutch plates in the radial direction, and without increasing the frame (constitution) of the clutch drum 6.

The present invention can be specified as the manufacturing method (the assembling method) of the continuously variable transmission 1 which is one example of the power transmission device.

This is the manufacturing method of the continuously variable transmission 1 including the clutch drum 6 including an opening formed at a first end in the rotation axis X direction (axial direction), and the bottom wall portion 61 formed at a second end in the axial direction; and the planetary gear set 3 received within the clutch drum 6.

In this manufacturing method, the carrier 34 of the planetary gear set 3 includes the flange portion 349 protruding toward the outer circumference side. Accordingly, firstly, the planetary gear set 3 is assembled to the clutch drum 6 so that the flange portion 349 is positioned between the bottom wall portion 61 and the ring gear 32 of the planetary gear set 3.

Then, the obtained subassembly SBA is inserted into the opening portion 105 of the transmission case 10 in a state where the carrier 34 side directs in the downward direction on the lower side. With this, the connection portion 343 of the carrier 34 and the shaft portion 81 of the transmission case 10 are spline-mounted.

By this configuration, the subassembly of the planetary gear set 3 and the forward clutch 4 of the forward and rearward switching mechanism 2 is set to another member (the power transmission mechanism (the pulley, the speed reduction device, and so on) of the transmission case 10 side. With this, it is possible to readily perform the assembly operation of the continuously variable transmission 1.

In this case, the flange portion 349 is supported by the ring gear 32. At the assembly operation, it is possible to prevent the falling of the carrier 34.

In the embodiment, the case in which the falling of the carrier 34 is prevented at the assembly operation is explained. However, the failing prevention configuration of the carrier 34 can be used in other scenes. For example, it is possible to prevent the falling when the unexpected force (for example, excessive torque input) is acted, and to prevent the damage of the components by the falling at the disassembly at the maintenance.

Besides, it is preferable that the protruding portion is is the flange. However, a plurality of protruding portions may be provided around the circumferential direction around the rotation axis X.

Hereinabove, the embodiment of the present invention is explained. The present invention is not limited to the aspects shown in the embodiment. The present invention can be varied as long as the variation is within the technical thought of the present invention.

The invention claimed is:

1. A power transmission device comprising:
   a cylindrical member including an opening formed at a first end in an axial direction, and a wall portion formed at a second end in the axial direction; and
   a planetary gear set received within the cylindrical member;
   a carrier of the planetary gear set which includes a protruding portion protruding toward an outer circumference side, and
   the protruding portion being positioned between the wall portion and a ring gear of the planetary gear set,
   wherein the carrier is integrally formed with a hub portion of a clutch; the hub portion is positioned on a wall portion side of the carrier; and an outermost circumference portion of the protruding portion is positioned radially outside of an outermost circumference portion of the hub portion, and wherein a movement of the ring gear toward the opening of the cylindrical member is restricted, and the ring gear is spline-mounted in the cylindrical member.

2. The power transmission device as claimed in claim 1, wherein the ring gear is a member different from the cylindrical member.

3. A manufacturing method of a power transmission device including a cylindrical member including an opening formed at a first end in an axial direction, and a wall portion formed at a second end in the axial direction; and a planetary gear set received within the cylindrical member, a carrier of the planetary gear set which includes a protruding portion protruding toward an outer circumference side, the manufacturing method comprising:

setting the planetary gear set to the cylindrical member so that the protruding portion is positioned between the wall portion and a ring gear of the planetary gear set; and setting the cylindrical member in which the planetary gear set is already set, to another member in a state in which the opening of the first end of the cylindrical member is directed in a downward direction.

\* \* \* \* \*